United States Patent
Eggert-Crowe et al.

(10) Patent No.: US 11,827,128 B2
(45) Date of Patent: Nov. 28, 2023

(54) TILT ADJUSTING MECHANISM, BABY SEAT BASE AND BABY SAFETY SEAT THEREWITH

(71) Applicant: Wonderland Switzerland AG, Steinhausen (CH)

(72) Inventors: Colin F. Eggert-Crowe, Philadelphia, PA (US); Kyle S Mason, Lititz, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/368,857

(22) Filed: Jul. 7, 2021

(65) Prior Publication Data
US 2022/0009388 A1    Jan. 13, 2022

(30) Foreign Application Priority Data
Jul. 10, 2020    (CN) .......................... 202021359197.5

(51) Int. Cl.
*B60N 2/28*    (2006.01)

(52) U.S. Cl.
CPC ......... *B60N 2/2875* (2013.01); *B60N 2/2821* (2013.01); *B60N 2/2884* (2013.01)

(58) Field of Classification Search
CPC ... B60N 2/2875; B60N 2/2821; B60N 2/2884
See application file for complete search history.

(56) References Cited

U.S. PATENT DOCUMENTS

| | | | | |
|---|---|---|---|---|
| 7,207,628 B2 * | 4/2007 | Eros | ..................... | B60N 2/2821 |
| | | | | 297/297 |
| 8,070,226 B2 * | 12/2011 | Dingler | ................ | B60N 2/2863 |
| | | | | 297/256.16 |
| 8,353,559 B2 * | 1/2013 | Williams | ............. | B60N 2/2845 |
| | | | | 297/256.13 |
| 8,998,318 B2 * | 4/2015 | Gaudreau, Jr. | ...... | B60N 2/2872 |
| | | | | 297/256.16 |
| 9,352,669 B2 * | 5/2016 | Spence | ................ | B60N 2/2851 |

(Continued)

FOREIGN PATENT DOCUMENTS

| | | |
|---|---|---|
| CN | 106394337 A | 2/2017 |
| CN | 110001469 A | 7/2019 |

(Continued)

*Primary Examiner* — Philip F Gabler
(74) *Attorney, Agent, or Firm* — Winston Hsu (57) ABSTRACT

A tilt adjusting mechanism for adjusting a tilting angle of a tilting component includes a supporting component and a locking component. The supporting component is disposed under the tilting component in a height-adjustable manner. At least two engaging holes are formed on the supporting component along a height adjustment direction. An end of the locking component rotatably engages in the tilting component, and another end of the locking component is configured to engage in one of the at least two engaging holes. A supporting height of the supporting component relative to the tilting component can be adjusted when the locking component disengages from the one of the at least two engaging holes, so as to adjust the tilting angle of the tilting component. The tilt adjusting mechanism has advantages of simple structure, low production cost and convenient operation.

18 Claims, 8 Drawing Sheets

(56) References Cited

U.S. PATENT DOCUMENTS 9,440,562 B2 9/2016 Heisey
2016/0347212 A1* 12/2016 Mason ................. B60N 2/2821

FOREIGN PATENT DOCUMENTS

DE 10 2016 109 691 A1 12/2016
TW 201238533 A1 10/2012
WO 2016/125410 A1 8/2016

* cited by examiner

TILT ADJUSTING MECHANISM, BABY SEAT BASE AND BABY SAFETY SEAT THEREWITH

BACKGROUND OF THE INVENTION

1. Field of the Invention

The present invention relates to a tilt adjusting mechanism, a baby seat base and a baby safety seat therewith, and more particularly, to a tilt adjusting mechanism, a baby seat base and a baby safety seat having advantages of simple structure, low production cost and convenient operation.

2. Description of the Prior Art

A baby safety seat is a seat specially designed for a baby. By assembling the baby safety seat in a car, the baby can ride on the baby safety seat, so that the baby can be restrained by the baby safety seat to ensure safety of baby. The baby safety seat generally includes a base and a seat body installed on the base. In the current market, there are some baby safety seats that can adjust a tilting angle of the seat body relative to the base. By adjusting the tilting angle of the seat body relative to the base, the baby can maintain the most comfortable posture. However, the conventional baby safety seat has the problems of complicated structure of a tilting angle adjustment mechanism and high production cost.

SUMMARY OF THE INVENTION

Therefore, an objective of the present invention is to provide a tilt adjusting mechanism, a baby seat base and a baby safety seat having advantages of simple structure, low production cost and convenient operation, for solving the aforementioned problems.

In order to achieve the aforementioned objective, the present invention discloses a tilt adjusting mechanism for adjusting a tilting angle of a tilting component includes a supporting component and a locking component. The supporting component is disposed under the tilting component in a height-adjustable manner. At least two engaging holes are formed on the supporting component along a height adjustment direction. An end of the locking component rotatably engages in the tilting component, and another end of the locking component is configured to engage in one of the at least two engaging holes. A supporting height of the supporting component relative to the tilting component can be adjusted when the locking component disengages from the one of the at least two engaging holes, so as to adjust the tilting angle of the tilting component.

Preferably, the locking component includes a flexible portion for rotatably engaging with the tilting component, and an engaging portion fixedly connected to the flexible portion and for engaging in the one of the at least two engaging holes.

Preferably, the flexible portion is an arc structure.

Preferably, the tilt adjusting mechanism further includes an operating component fixedly connected to the locking component and located on an outer side of the tilting component.

Preferably, the locking component includes an inserting opening, and the operating component is inserted into the inserting opening.

Preferably, at least one groove is further formed on the supporting component along the height adjustment direction, and the locking component includes at least one protrusion slidably disposed in the at least one groove.

In order to achieve the aforementioned objective, the present invention further discloses a baby seat base including a tilting component being a seat body connected to a seat, and the aforementioned tilt adjusting mechanism.

Preferably, the tilting component includes a main body portion and a tilting portion obliquely connected to the main body portion.

Preferably, a fender is disposed on an upper end of the tilting portion.

Preferably, the tilting component includes at least one supporting portion for abutting against the seat.

Preferably, the tilting component includes a connecting portion for connecting with the seat.

In order to achieve the aforementioned objective, the present invention further discloses a baby safety seat including a seat and the aforementioned baby seat base, and the seat is installed on the tilting component.

In summary, the tilt adjusting mechanism of the present application can release the supporting component by disengaging the locking component from the engaging hole, so as to adjust the supporting height of the supporting component relative to the tilting component, thereby adjusting the tilting angle of the tilting component, for adjusting the tilting angle of the seat installed on the tilting component. Therefore, the tilt adjusting mechanism of the present application has advantages of simple structure, low production cost and convenient operation.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
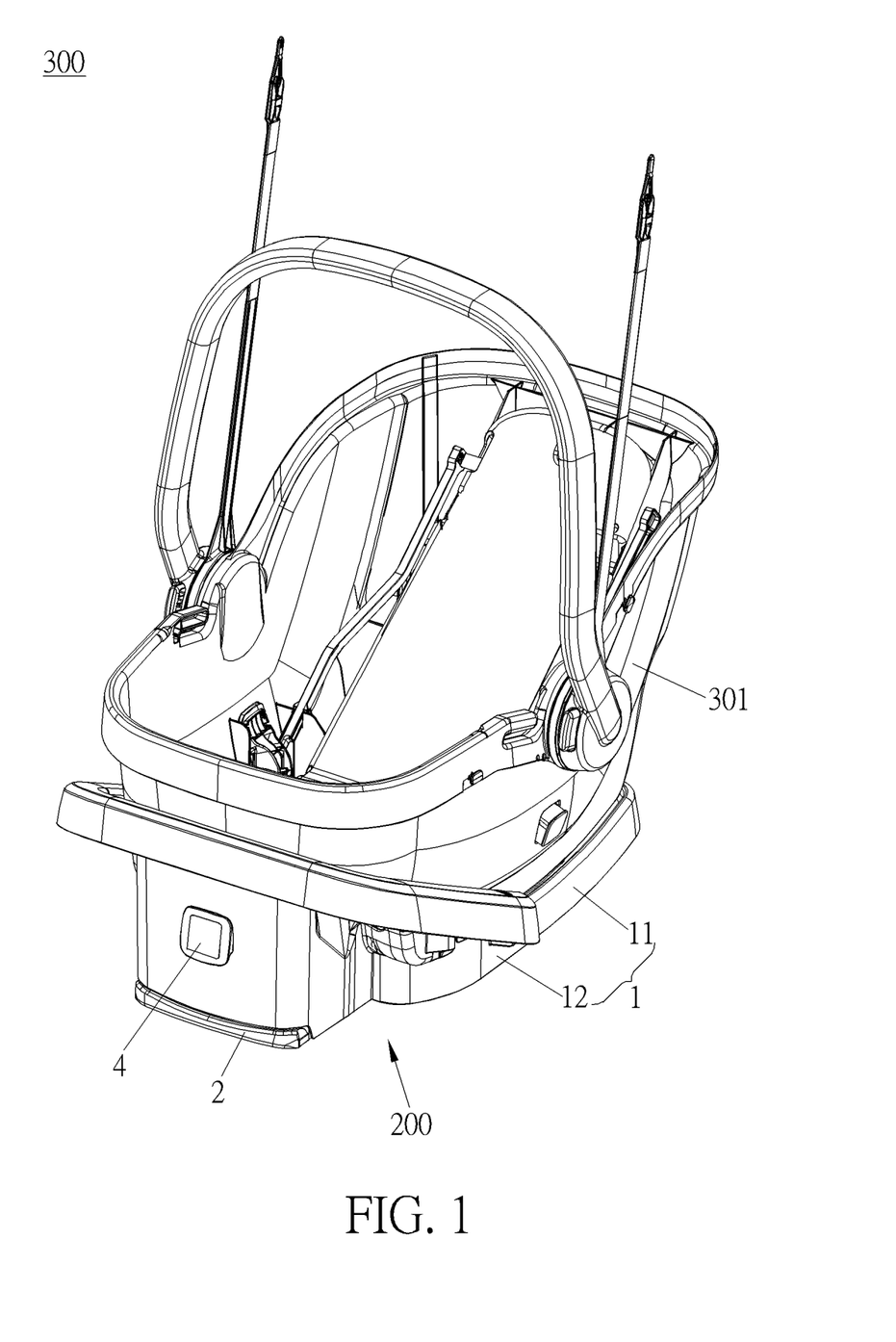
FIG. 1 is a schematic drawing of a baby safety seat of the present application.
Figure 2:
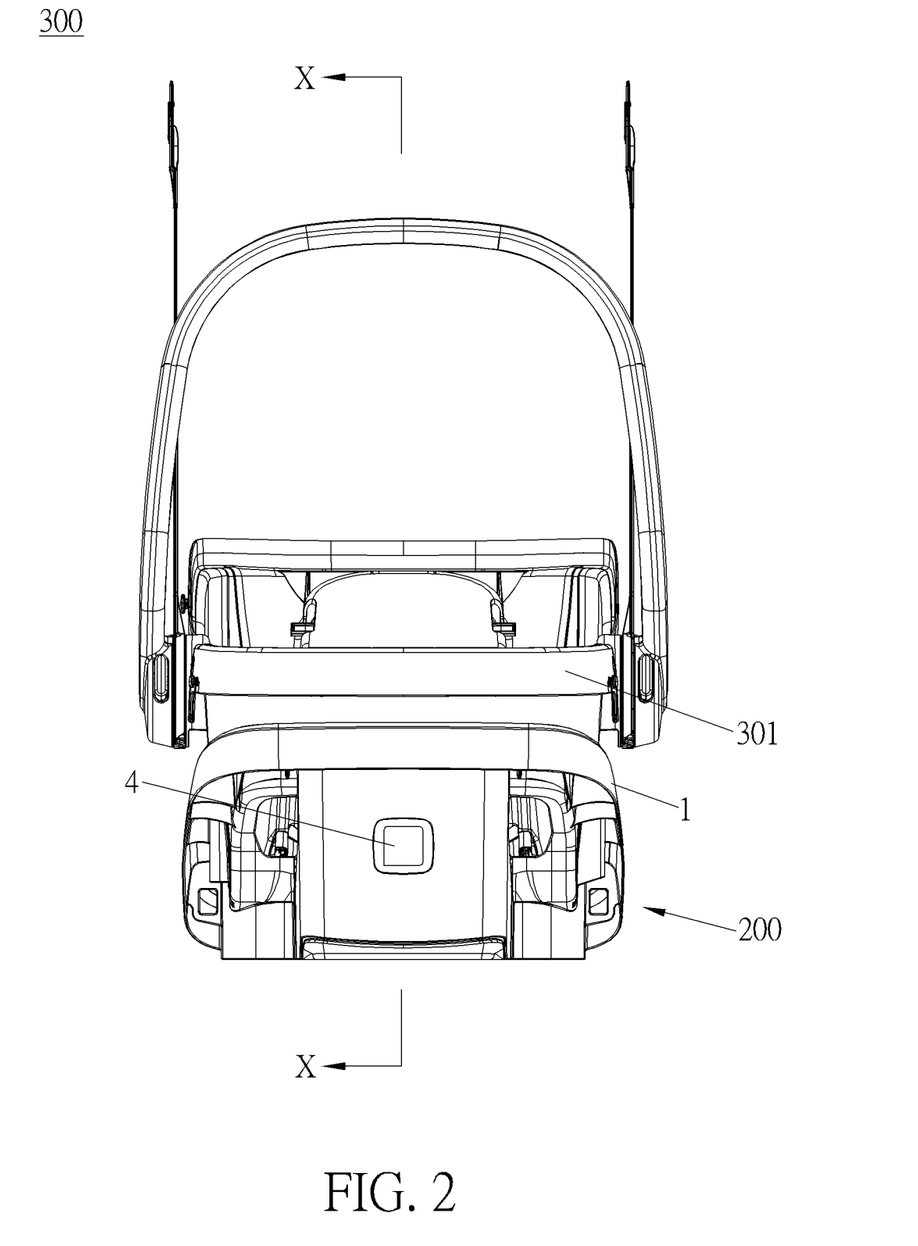
FIG. 2 is a front view of the baby safety seat of the present application.
Figure 3:
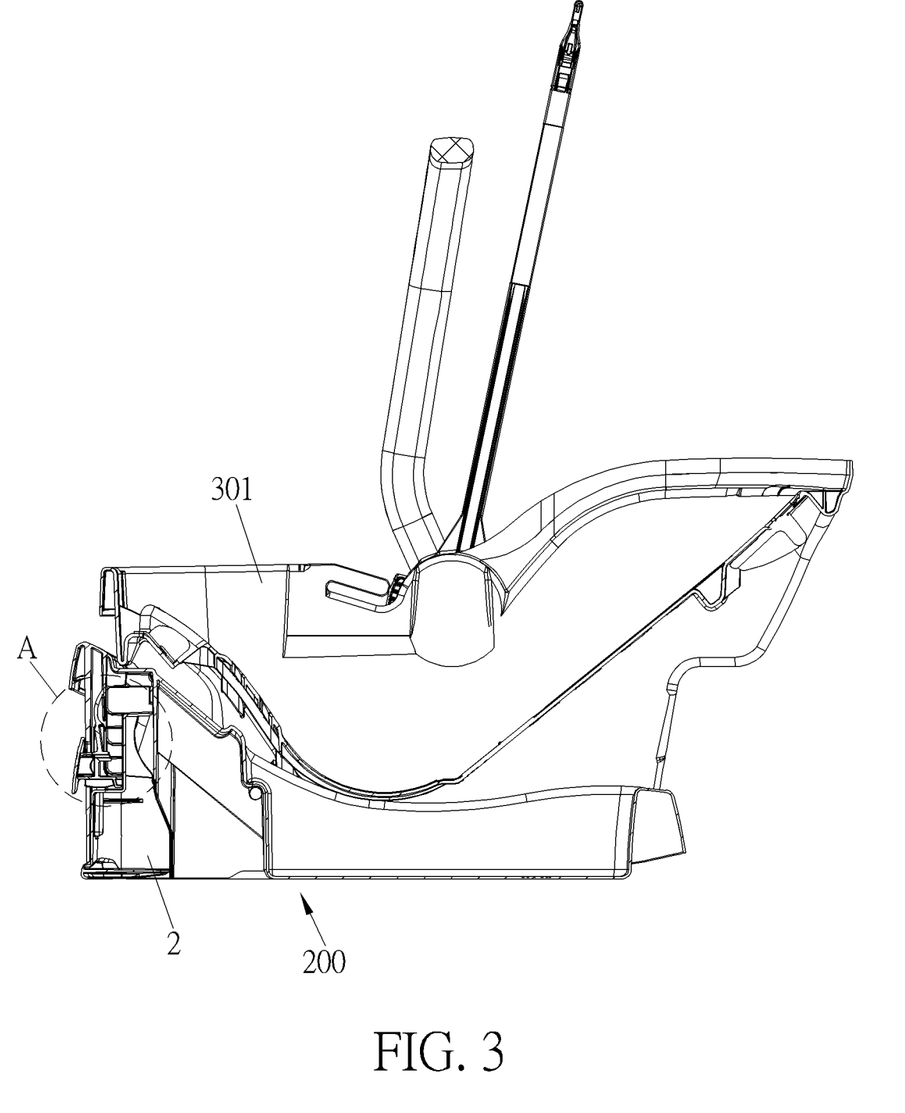
FIG. 3 is a sectional diagram of the baby safety seat taken along a sectional line X-X of FIG. 2 of the present application.
Figure 4:
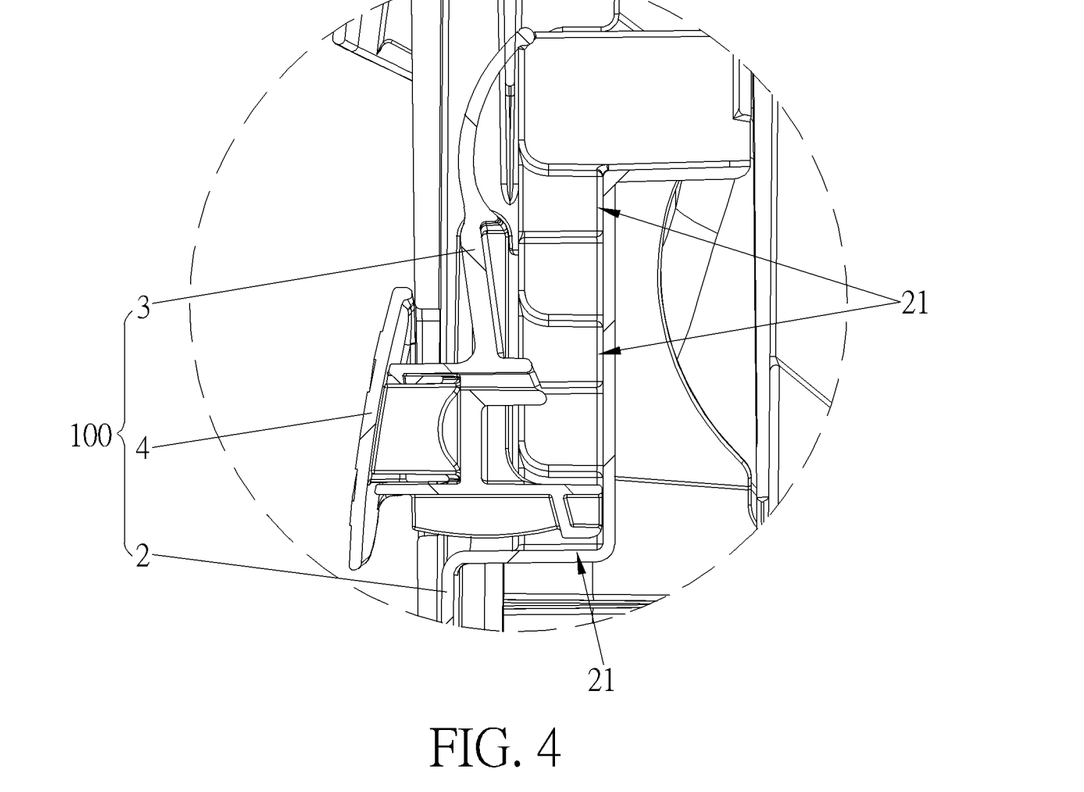
FIG. 4 is an enlarged diagram of a portion A of FIG. 3 of the present application.
Figure 5:
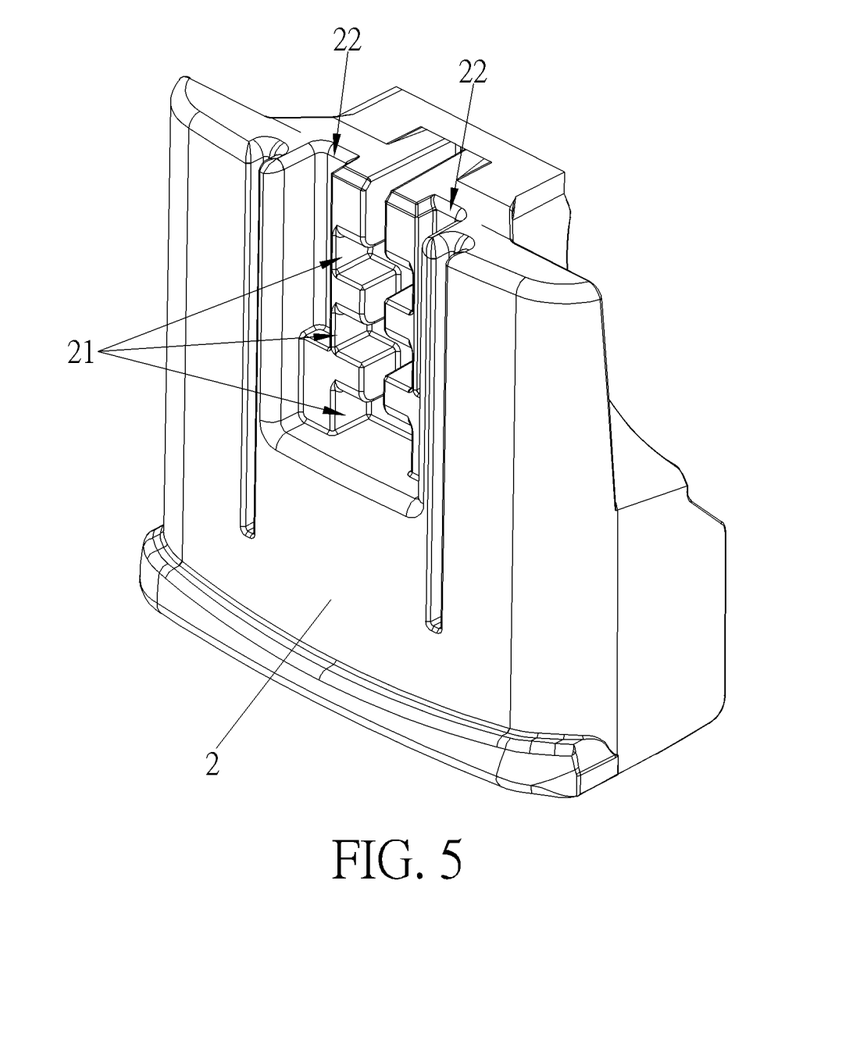
FIG. 5 is a structural diagram of a supporting component of the present application.

Please refer to FIG. 1 to FIG. 5. FIG. 1 is a schematic drawing of a baby safety seat 300 of the present application. FIG. 2 is a front view of the baby safety seat 300 of the present application. FIG. 3 is a sectional diagram of the baby safety seat 300 taken along a sectional line X-X of FIG. 2 of the present application. FIG. 4 is an enlarged diagram of a portion A of FIG. 3 of the present application. FIG. 5 is a structural diagram of a supporting component 2 of the present application. The baby safety seat 300 of the present application includes a seat 301 and a baby seat base 200. The seat 301 is installed on the baby seat base 200. The seat 301 can be a basket for a baby to lie on or a seat for a baby to sit on. The baby seat base 200 includes a tilting component 1 and a tilt adjusting mechanism 100 for adjusting a tilting angle of the tilting component 1. The tilting component 1 can be a seat body, the seat 301 is installed on the tilting component 1, but it is not limited thereto. The tilt adjusting mechanism 100 includes a supporting component 2 and a locking component 3. The supporting component 2 is disposed under the tilting component 1 in a height-adjustable manner. The supporting component 2 can provide a supporting function for an end of the tilting component 1. At least two engaging holes 21 are formed on the supporting component 2 along a height adjustment direction of the supporting component 2. Specifically, the height adjustment direction of the supporting component 2 can be a vertical direction, and a height of the supporting component 2 relative to the tilting component 1 along the vertical direction can be adjusted. The height adjustment direction of the supporting component 2 is not limited to this. An end of the locking component 3 rotatably engages in the tilting component 1, and another end of the locking component 3 is configured to engage in one of the at least two engaging holes 21, so as to lock the supporting component 2 with the tilting component 1. On the other hand, a supporting height of the supporting component 2 relative to the tilting component 1 can be adjusted when the locking component 3 disengages from the engaging hole 21, so as to adjust the tilting angle of the tilting component 1 for adjusting a tilting angle of the seat 301 installed on the tilting component 1.

Figure 7:
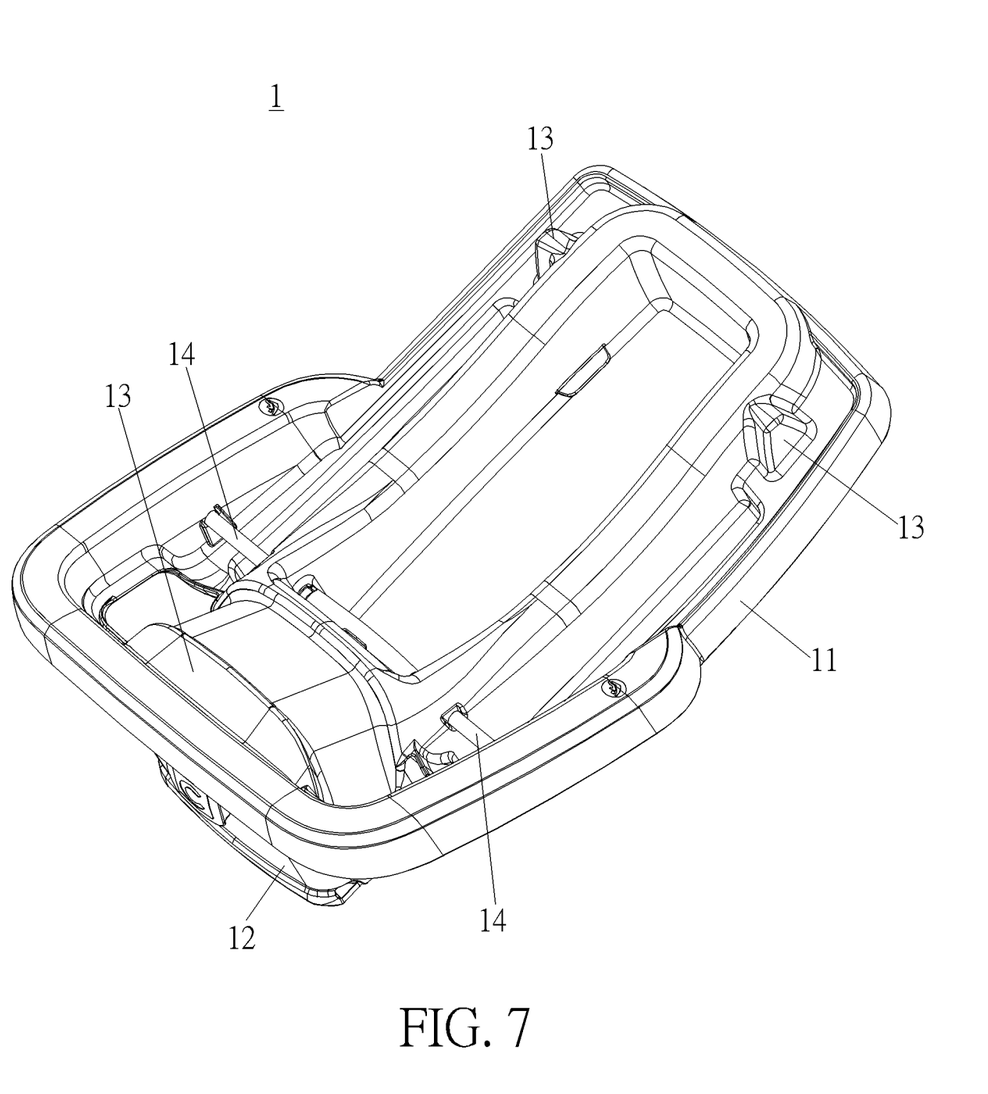
FIG. 7 is a structural diagram of a tilting component of the present application.
Figure 8:
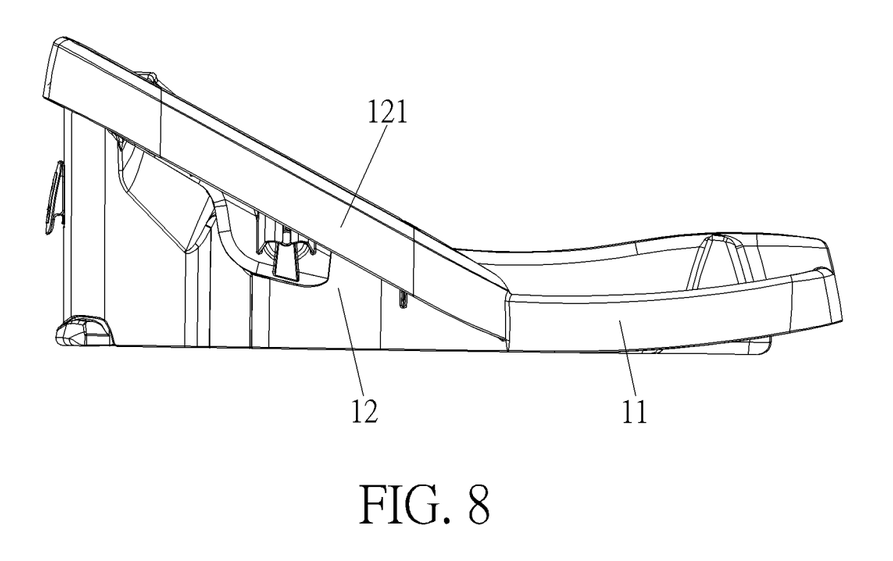
FIG. 8 is a lateral view of the tilting component of the present application.

Please refer to FIG. 7 and FIG. 8. FIG. 7 is a structural diagram of the tilting component 1 of the present application. FIG. 8 is a lateral view of the tilting component 1 of the present application. The tilting component 1 includes a main body portion 11 and a tilting portion 12 obliquely connected to the main body portion 11. Specifically, a fender 121 is disposed on an upper end of the tilting portion 12. In the event of a vehicle collision, the fender 121 can bear against a car seat, thereby preventing the baby safety seat 300 from overturning. More specifically, the fender 121 can be obliquely arranged on a peripheral side of the upper end of the tilting portion 12, but it is not limited thereto. The tilting component 1 further includes at least one supporting portion 13 for abutting against the seat 301. Specifically, both of the main body portion 11 and the tilting portion 12 can be provided with the supporting portion 13, and each supporting portion 13 can be abutted against and inserted into the seat 301 through at least one slot structure of the seat 301. Furthermore, the tilting component 1 further includes a connecting portion 14 for connecting with the seat 301. The connecting portion 14 can be a cross bar, the seat 301 can be hooked with the cross bar through a hook, but it is not limited thereto.

Figure 6:
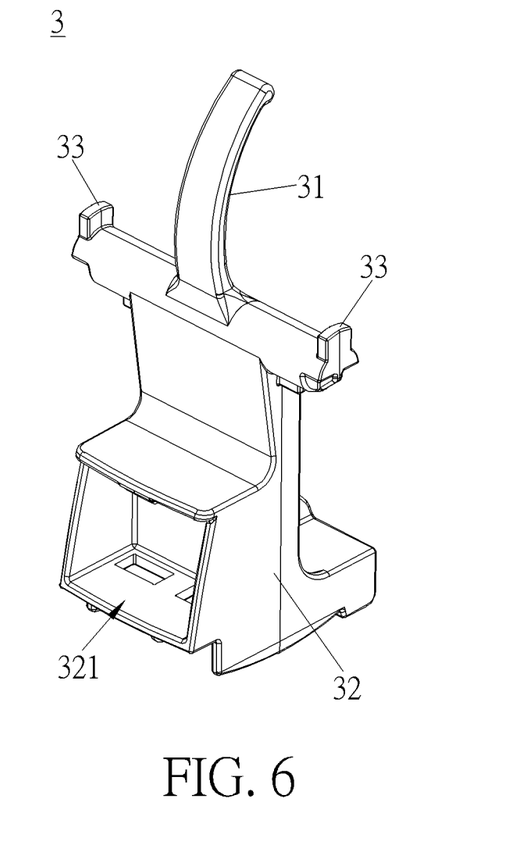
FIG. 6 is a structural diagram of a locking component of the present application.

Please refer to FIG. 6. FIG. 6 is a structural diagram of the locking component 3 of the present application. The locking component 3 includes a flexible portion 31 for rotatably engaging with the tilting component 1, and an engaging portion 32 fixedly connected to the flexible portion 31 and for engaging in the one of the at least two engaging holes 21. Specifically, the flexible portion 31 can be an arc structure, so as to facilitate rotation of the flexible portion 31.

Please refer to FIG. 5 and FIG. 6. At least one groove 22 is further formed on the supporting component 2 along the height adjustment direction of the supporting component 2, and the locking component 3 includes at least one protrusion 33 slidably disposed in the at least one groove 22. In this embodiment, there are two grooves 22 and two protrusions 33, but it is not limited thereto. When the supporting height of the support component 2 relative to the tilting component 1 is adjusted up and down, the protrusion 33 can slide along the corresponding groove 22, so that the cooperation of the protrusion 33 and the groove 22 can provide a guiding function for a vertical height adjustment of the supporting component 2.

Please refer to FIG. 4 and FIG. 6. The tilt adjusting mechanism further includes an operating component 4 fixedly connected to the locking component 3 and located on an outer side of the tilting component 1. The locking component 3 can engage with or disengage from the engaging hole 21 by operating the operating component 4 to rotate the locking component 3. Specifically, the locking component 3 includes an inserting opening 321 disposed on the engaging portion 32, the operating component 4 can be inserted into the inserting opening 321, but it is not limited thereto.

Please refer to FIG. 1 to FIG. 8. The operational principle of the tilt adjusting mechanism 100 of the present application is introduced as follows. When the tilting angle of the tilting component 1 needs to be adjusted, the locking component 3 can be operated to rotate through the operating component 4, so that the engaging portion 32 of the locking component 3 can be disengaged from one of the engaging holes 21 on the supporting component 2, so as to release the supporting component 2, and then by adjusting the height of the supporting component 2 relative to the tilting component 1, the supporting height of the supporting component 2 relative to the tilting component 1 can be adjusted, thereby adjusting the tilting angle of the tilting component 1. Afterwards, the locking component 3 can be operated to rotate through the operating member 4, so that the locking portion 32 of the locking component 3 engages with another engaging hole 21 on the supporting component 2, thereby locking the supporting component 2.

In conclusion, the tilt adjusting mechanism 100 of the present application can release the supporting component 2 by disengaging the locking component 3 from the engaging hole 21, so as to adjust the supporting height of the supporting component 2 relative to the tilting component 1, thereby adjusting the tilting angle of the tilting component 1, for adjusting the tilting angle of the seat 301 installed on the tilting component 1. Therefore, the tilt adjusting mechanism 100 of the present application has advantages of simple structure, low production cost and convenient operation.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A tilt adjusting mechanism for adjusting a tilting angle of a tilting component, the tilt adjusting mechanism comprising:
    a supporting component disposed under the tilting component in a height-adjustable manner, at least two engaging holes being formed on the supporting component along a height adjustment direction; and
    a locking component, an end of the locking component rotatably engaging in the tilting component, another end of the locking component being configured to engage in one of the at least two engaging holes, and a supporting height of the supporting component relative to the tilting component being adjusted when the locking component disengages from the one of the at least two engaging holes, so as to adjust the tilting angle of the tilting component, wherein at least two grooves are further symmetrically formed on two lateral sides of the at least two engaging holes on the supporting component along the height adjustment direction, and the locking component comprises at least two protrusions slidably disposed in the at least two grooves respectively, when the supporting height of the support component relative to the tilting component is adjusted up and down to adjust the tilting angle of the tilting component, the at least two protrusions slide along the at least two grooves respectively, so that cooperation of the at least two protrusions and the at least two grooves provides a guiding function for a vertical height adjustment of the supporting component.

2. The tilt adjusting mechanism of claim 1, wherein the locking component comprises:
    a flexible portion for rotatably engaging with the tilting component; and
    an engaging portion fixedly connected to the flexible portion and for engaging in the one of the at least two engaging holes.

3. The tilt adjusting mechanism of claim 2, wherein the flexible portion is an arc structure.

4. The tilt adjusting mechanism of claim 1, further comprising an operating component fixedly connected to the locking component and located on an outer side of the tilting component.

5. The tilt adjusting mechanism of claim 4, wherein the locking component comprises an inserting opening, and the operating component is inserted into the inserting opening.

6. A baby seat base comprising:
    a tilting component being a seat body connected to a seat; and
    a tilt adjusting mechanism for adjusting a tilting angle of the tilting component, the tilt adjusting mechanism comprising:
        a supporting component disposed under the tilting component in a height-adjustable manner, at least two engaging holes being formed on the supporting component along a height adjustment direction; and
        a locking component, an end of the locking component rotatably engaging in the tilting component, another end of the locking component being configured to engage in one of the at least two engaging holes, and a supporting height of the supporting component relative to the tilting component being adjusted when the locking component disengages from the one of the at least two engaging holes, so as to adjust the tilting angle of the tilting component, wherein at least two grooves are further symmetrically formed on two lateral sides of the at least two engaging holes on the supporting component along the height adjustment direction, and the locking component comprises at least two protrusions slidably disposed in the at least two grooves respectively, when the supporting height of the support component relative to the tilting component is adjusted up and down to adjust the tilting angle of the tilting component, the at least two protrusions slide along the at least two grooves respectively, so that cooperation of the at least two protrusions and the at least two grooves provides a guiding function for a vertical height adjustment of the supporting component.

7. The baby seat base of claim 6, wherein the tilting component comprises a main body portion and a tilting portion obliquely connected to the main body portion.

8. The baby seat base of claim 7, wherein a fender is disposed on an upper end of the tilting portion.

9. The baby seat base of claim 6, wherein the tilting component comprises at least one supporting portion for abutting against the seat.

10. The baby seat base of claim 6, wherein the tilting component comprises a connecting portion for connecting with the seat.

11. A baby safety seat comprising:
    a seat; and
    a baby seat base connected to the seat, the baby seat base comprising:
        a tilting component being a seat body, and the seat being installed on the tilting component; and
        a tilt adjusting mechanism for adjusting a tilting angle of the tilting component, the tilt adjusting mechanism comprising:
            a supporting component disposed under the tilting component in a height-adjustable manner, at least two engaging holes being formed on the supporting component along a height adjustment direction; and
            a locking component, an end of the locking component rotatably engaging in the tilting component, another end of the locking component being configured to engage in one of the at least two engaging holes, and a supporting height of the supporting component relative to the tilting component being adjusted when the locking component disengages from the one of the at least two engaging holes, so as to adjust the tilting angle of the tilting component, wherein at least two grooves are further symmetrically formed on two lateral sides of the at least two engaging holes on the supporting component along the height adjustment direction, and the locking component comprises at least two protrusions slidably disposed in the at least two grooves respectively, when the supporting height of the support component relative to the tilting component is adjusted up and down to adjust the tilting angle of the tilting component, the at least two protrusions slide along the at least two grooves respectively, so that cooperation of the at least two protrusions and the at least two grooves provides a guiding function for a vertical height adjustment of the supporting component.

12. The baby safety seat of claim 11, wherein the locking component comprises:

a flexible portion for rotatably engaging with the tilting component; and an engaging portion fixedly connected to the flexible portion and for engaging in the one of the at least two engaging holes.

13. The baby safety seat of claim 12, wherein the flexible portion is an arc structure.

14. The baby safety seat of claim 11, further comprising an operating component fixedly connected to the locking component and located on an outer side of the tilting component.

15. The baby safety seat of claim 14, wherein the locking component comprises an inserting opening, and the operating component is inserted into the inserting opening.

16. The baby safety seat of claim 11, wherein the tilting component comprises a main body portion and a tilting portion obliquely connected to the main body portion.

17. The baby safety seat of claim 16, wherein a fender is disposed on an upper end of the tilting portion.

18. The baby safety seat of claim 11, wherein the tilting component comprises at least one supporting portion for abutting against the seat.

* * * * *